March 19, 1940.                    R. L. WILSON                    2,193,910
MEANS FOR DETERMINING THE ACCELERATION OR DECELERATION OF MOVING BODIES
Filed Nov. 11, 1936
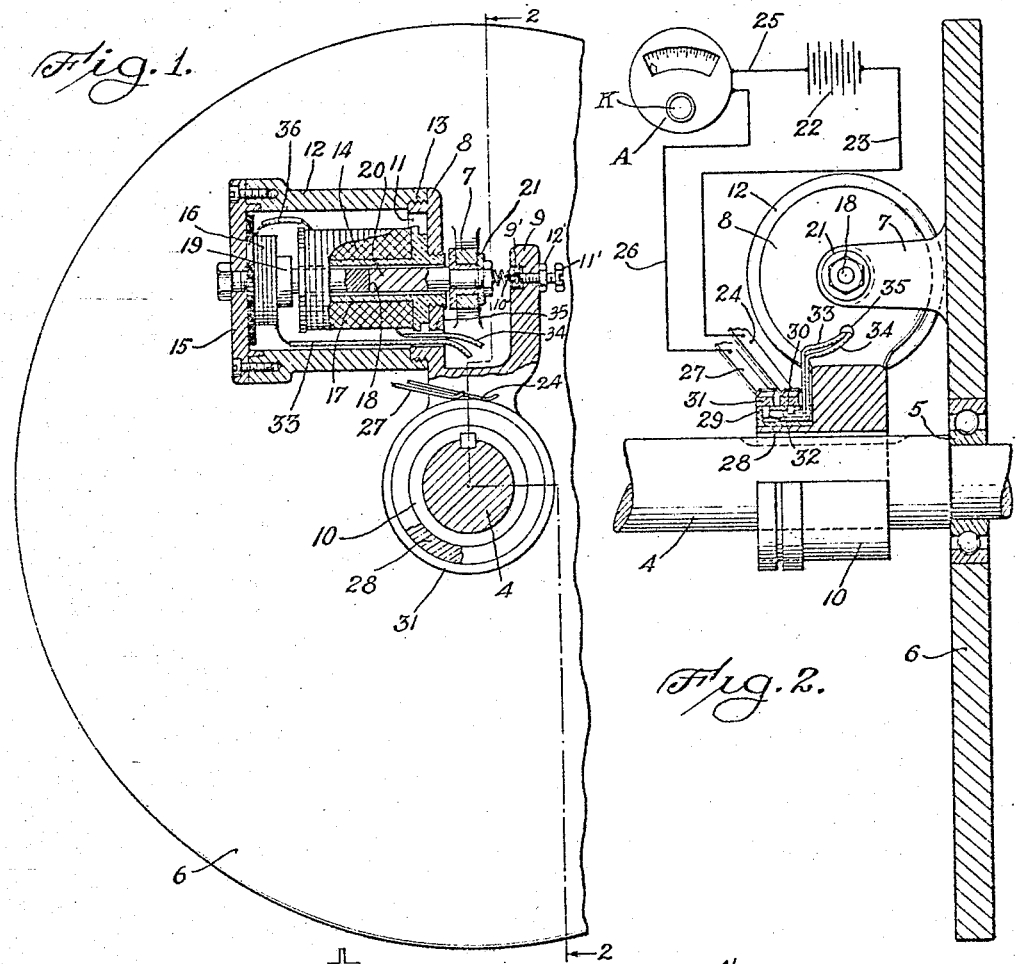
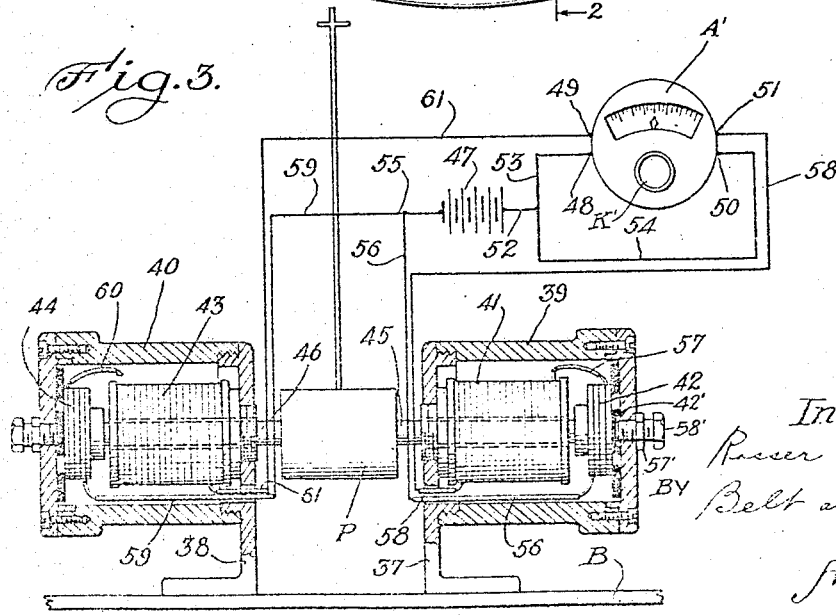
Inventor
Rosser L. Wilson
BY Belt and Willice
Attorneys Patented Mar. 19, 1940

2,193,910

UNITED STATES PATENT OFFICE 2,193,910

MEANS FOR DETERMINING THE ACCELERATION OR DECELERATION OF MOVING BODIES

Rosser L. Wilson, Mahwah, N. J., assignor to The American Brake Shoe and Foundry Company, New York, N. Y., a corporation of Delaware Application November 11, 1936, Serial No. 110,411

2 Claims. (Cl. 175—183)

This invention relates to a means for determining the acceleration or deceleration of moving bodies when the velocity thereof is affected.

Acceleration may be defined as the rate of increase of velocity of a moving body in unit time. It is expressed, for example, in revolutions per minute per minute or in revolutions per second per second or in feet per second per second. Deceleration is the opposite, that is to say, it may be defined as the rate of increase of velocity of a moving body in unit time. It is expressed similarly to acceleration.

The primary object of my invention is to determine directly the acceleration or deceleration of a moving body when the velocity thereof is affected and an ancillary object is to either indicate acceleration or deceleration on an instrument which may be calibrated, if desired, to read acceleration or deceleration directly or to utilize the determined rate of change in the velocity to control the operation of selected apparatus.

Another object is to determine the acceleration or deceleration of moving bodies at all speeds of movement thereof and a further object is to enable use of the same mechanism to determine the acceleration or deceleration of moving bodies at all speeds of movement of the bodies.

In testing various kinds of devices which affect the velocity of moving bodies, among which may be cited brake elements for decelerating rotating bodies, it is desirable to compare different devices whereby the relative efficiencies thereof may be determined and it is essential that this be performed accurately so that reliable results will be obtained.

It is therefore still another object of my invention to accurately determine the acceleration or deceleration of a moving body when the velocity thereof is affected in order that reliable comparisons may be made between different devices affecting the velocity of the body, and a further object is to effect this in a sensitive manner so that slight variations in the rate of change of velocity may be determined and close comparison of devices may be made, and objects ancillary to this are to eliminate as far as possible relative movement in the actuating means of the device employed to determine the acceleration or deceleration and by reason of this elimination of relative movement to insure accuracy in such determination.

A further object is to determine acceleration or deceleration by measuring the resultant force exerted by the inertia of a known mass when the velocity of a moving body is affected.

A still further object is to effect a flow of current in an electrical circuit proportionate to the rate of variation of the velocity of a moving body and to measure such current flow in the circuit and thereby determine the acceleration or deceleration of the moving body.

Selected embodiments of my invention are illustrated in the accompanying drawing wherein Fig. 1 is a fragmentary side elevational view of a rotatable disc and wherein certain of the means responsive to the rate of variation of the velocity of a rotating body associated with the disc are shown in section;

Fig. 2 is a sectional detail view taken substantially on the line 2—2 on Fig. 1 and wherein electrical apparatus used with the illustrated devices is diagrammatically illustrated; and Fig. 3 is a view, partly in elevation and partly in section, of a form of my invention adapted for measuring the acceleration or deceleration of a rectilinearly movable body and wherein electrical apparatus used with the illustrated devices is diagrammatically illustrated.

Referring to the accompanying drawing and particularly to Figs. 1 and 2 thereof wherein one form of my invention is illustrated, 4 indicates a shaft to which rotative movement is imparted from a suitable source of power and which may be accelerated or decelerated as desired. An anti-friction bearing 5 is mounted on this shaft and rotatably supports a disc or flywheel 6 on the shaft. A lug 7 extends axially from one face of the disc into a bifurcation provided between the arms 8 and 9 projecting from the collar 10 fast on the shaft 4 in spaced relation with the bearing 5.

An annular flange 11 projects from the outwardly disposed face of the arm 8 and one end of a sleeve 12 is screw-threaded onto the periphery of this flange as indicated at 13. A solenoid coil 14 is mounted on the arm 8 and is enclosed in the sleeve 12. The end of the sleeve 12 opposite that connected to the arm 8 is closed by a plate 15, on the inner side of which is a carbon pile 16 is mounted, the pile being insulated from the plate. The coil 14 is wound on a sleeve 17 of insulating material and through which a sectional plunger, generally indicated by 18, is freely passed. The plunger 18 comprises sections of unlike metals, one magnetic and the other non-magnetic. For example, the section 19 of the plunger 18 may be of iron and the section 20 may be of brass. The free end of the section 19 of the plunger 18 is enlarged and is disposed to bear upon the carbon pile 16. The free end of the section 20 of the plunger extends into a bushing 21 of insulating material in the lug 7 whereby this end of the plunger 18 is firmly connected to the lug and the plunger is insulated from the frame of the structure.

A recess 9' is provided in the arm 9 and a spring 10' is extended into this recess to bear on the adjusting screw 11' having a lock nut 12' thereon. The spring 10' is engaged with the adjacent end of the plunger 18 for a purpose explained presently and is insulated from the adjusting screw 11', a member of insulating material being mounted in the recess and disposed between the spring and the adjusting screw.

As best shown in Fig. 2, a source of current such as a battery 22 is provided. A conductor 23 extends from one terminal of this battery to a brush 24. A conductor 25 extends from the other end of the battery 22 to one terminal of a suitable electrical instrument A such as an ammeter. A conductor 26 extends from the other terminal of this instrument to a brush 27. The instrument may be provided with a knob K by means of which the scale of the instrument may be adjusted to a zero position when a balanced condition, described hereinafter, is established.

The collar 10 includes a reduced portion 28 on which a ring of insulating material 29 is fast. A conductor ring 30 is fast on the periphery of the insulating ring 29 and the brush 24 bears thereon. A conductor ring 31 is also fast on the periphery of the insulating ring 29 in spaced relation with the ring 30 and the brush 27 bears thereon.

A pocket 32 is formed in the ring 29 and a conductor 33 extends into this pocket to be connected to the conductor ring 30. Another conductor 34 extends into this pocket to be connected to the conductor ring 31. As best shown in Fig. 1, the conductors 33 and 34 are passed through an opening 35 in the arm 8 and the conductor 34 is connected to one end of the winding of the coil 14. A conductor 36 interconnects the other end of the winding of this coil and the carbon pile 16. The conductor 33 is also connected to the carbon pile and the connections are such that the pile is disposed between the conductors 33 and 36. The above described connections are such that the carbon pile 16 and coil 14 are connected in series with each other and with the instrument A and battery 22, the rings 30 and 31 and brushes 24 and 27 affording interconnection between the rotatable coil and carbon pile and the stationary battery and instrument.

The disc 6, lug 7 and plunger 18 are of known mass and by reason of the anti-friction bearing 5 these parts are free to float on the shaft 4 but rotate with the shaft, when it is driven, by reason of the extension of the lug 7 into the bifurcation between the arms 8 and 9. The spring 10', which is insulated from the arm 9, is adjusted to exert such force on the plunger 18 that when the disc 6 and the parts thereon and shaft 4 and the parts thereon are both rotating at a given velocity, the plunger bears on the carbon pile 16 to establish the resistance of the pile at a point such that the current flow through the coil 14 sets up a magnetic field which, by its effect on the plunger, maintains the plunger in its position. In this way a balanced condition is established.

The device as thus far described is particularly useful for indicating deceleration as, for example, in a machine for testing brake shoes wherein means to which a shoe may be applied to effect deceleration are connected to the shaft 4 so that when a shoe is applied the shaft will be decelerated. Such deceration is indicated on the instrument A and by comparing the deceleration effected under identical conditions by different shoes the relative efficiencies of the shoes may be determined.

When the device is used to determine deceleration, the shaft 4 and disc 6 are rotated counterclockwise as viewed in Fig. 1, and the spring 10' is so adjusted that when the shaft 4 and disc 6 are rotating together at a given velocity, the pressure of the plunger 18 on the carbon pile 16 establishes a balanced condition, as aforesaid. This establishes a current flow that is indicated on the instrument but the knob K may now be grasped and the scale of the instrument adjusted to establish a zero condition on the instrument, that is to say, to align the indicator of the instrument with zero of the scale.

When the shaft 4 is decelerated, the inertia of the disc 6 exerts a force on the plunger 18 against the carbon pile 16 to decrease the resistance thereof. This force is directly proportionate to the deceleration as is the decrease in the resistance of the carbon pile 16. This change in resistance varies the current flow through the coil 14 which instantly increases sufficiently to reestablish a balanced condition, the force exerted by the coil on the plunger being substantially equal to and opposite to the inertia force of the disc on the plunger 16 and insuring that the plunger maintains the newly established pressure on the carbon pile. The ammeter A measures the increase in current flow under these conditions and when an indicating instrument, such as that illustrated, is employed the current flow is registered but if a recording instrument of the kind well understood in the art is substituted for the indicating instrument illustrated a record of the increase in current flow is produced.

Since the disc 6, lug 7 and plunger 18 are of a known mass, the deceleration may be determined from the amperage indicated or recorded by the instrument A in the manner well understood in the art. Furthermore, as is well understood, the instrument A may be calibrated to directly indicate or record the deceleration.

The form of the invention shown in Fig. 3 is adapted for determining the acceleration or deceleration of a rectilinearly moving body and especially of a body moving horizontally in a straight line. To this end a mass such as a pendulum P or other freely movable mass is suitably supported on the moving body B which exerts a force rearwardly upon acceleration of the body and forwardly upon deceleration of the body.

A bracket 37 is mounted forwardly of the pendulum P on the body B and another bracket 38 is mounted on said body rearwardly of the pendulum. A sleeve 39 is mounted on the bracket 37 to extend forwardly therefrom and another sleeve 40 is mounted on the bracket 38 to extend rearwardly therefrom. The sleeves 39 and 40 are similar to the sleeve 12 illustrated in Fig. 1.

A coil 41 is mounted in the sleeve 39 and a carbon pile 42 is also mounted therein and a coil 43 and a carbon pile 44 are mounted in the sleeve 40. A plunger 45 extends forwardly from the pendulum P through the coil 41 and is adapted to bear on the carbon pile 42 and exert force thereon upon deceleration of the body B. The plunger 46 extends rearwardly from the pendulum P through the coil 33 to bear upon the carbon pile 44 and exert force thereon upon acceleration of the body B. Both the plungers 45 and 46 are constructed similarly to the plunger 18.

The carbon piles 42 and 44 are maintained in engagement with the plungers 45 and 46 by adjusting screws as 58' which are retained in adjusted positions by the lock nuts 57'. This adjustment performs the same function as the spring 10' and adjusting screw 11'.

A source of current such as the battery 47 is provided. An instrument A', such as an indicating or recording ammeter, is also provided and in this instance the indicating element of the instrument is arranged to be movable in opposite directions from a median position, said element moving to the right, as viewed in Fig. 3, to indicate or record deceleration of the body B and to the left to indicate or record acceleration of said body. The instrument A' is preferably equipped with a knob K' for centering the scale thereof in the same manner as that in which the knob K is employed to center the scale of the instrument A.

Terminals 48 and 49 are provided on the left-hand side of the instrument A' and the means responsive to acceleration are connected thereto while terminals 50 and 51 are provided on the right-hand side of the instrument and the means responsive to deceleration of the body B are connected thereto. A conductor 52 leads from one terminal of the battery 47 and a conductor 53 interconnects the conductor 52 and the terminal 48 while a conductor 54 interconnects the conductor 52 and the terminal 50. A conductor 55 extends from the other terminal of the battery 47.

A conductor 56 extends from the conductor 55 to the carbon pile 42. Another conductor 57 extends from the carbon pile to one end of the winding of the coil 41, the carbon pile 42 being disposed between the conductors 56 and 57. A conductor 58 connects the other end of the winding of the coil 41 with the terminal 51. A conductor 59 leads from the conductor 55 to the carbon pile 44 and a conductor 60 leads from this carbon pile to one end of the winding of the coil 43, the carbon pile 44 being disposed between the conductors 59 and 60. A conductor 61 connects the other end of the winding of the coil 43 with the terminal 49.

When the body B is moving at a given velocity the pendulum P bears upon the carbon piles 42 and 44 to set up a current flow through the coils 41 and 43 that sets up magnetic fields which act on the plungers 45 and 46 to maintain these plungers in position to so bear on the carbon piles that the aforesaid current flow is maintained constant. When, however, the body B is accelerated, the pendulum P exerts an inertia force directly proportional to the degree of acceleration of the body B upon the carbon pile 44 to decrease the resistance thereof which effects a flow of current through the coil 43 with the effect described above in connection with coil 14, and the movable element of the instrument A' moves to the left as viewed in Fig. 3 to indicate the amperage of this increased current flow whereupon the acceleration is determined directly as described heretofore. Likewise, when the body B is decelerated an inertia force is impressed upon the carbon pile 42 whereupon the element of the instrument A moves to the right as viewed in Fig. 3, and as above described the deceleration may therefore be determined directly.

By providing a device similar to that shown in Figs. 1 and 2 and facing this device in the direction opposite to that in which the illustrated device faces, acceleration may be determined. Furthermore, by reason of the rigid construction afforded the device is not affected by centrifugal force even when the disc 6 is rotated at a high rate of speed.

Both forms of the invention have been described as being employed to indicate or record acceleration or deceleration but it is to be understood that suitable means to control operation of selected apparatus might be substituted for the indicating or recording instruments. Thus, for example, control apparatus could be provided for regulating the operation of the means which effect the acceleration or deceleration whereby such acceleration or deceleration could be controlled. Such an arrangement will be particularly advantageous in controlling brakes effecting the deceleration of moving bodies so that the deceleration can be maintained constant within close limits, and this arrangement might be utilized in connection with the brake system of railway equipment whereby smooth stops of the equipment can be effected rapidly without objectionable jerking or sliding of the wheels.

It is to be understood that while I have illustrated and described the known mass as being moved at a velocity equal to that of the body, it is only important that the mass be moved at a velocity proportionate to that of the body.

One of the important advantages of my invention is that the resistance of the carbon pile or other variable resistance devices is affected by very slight movements measurable, for example, in thousandths of an inch, and therefore relative movement in the actuating devices of the means which I employ for determining acceleration or deceleration is reduced to a minimum and is substantially eliminated and this is augmented by the fact that the known mass is engaged with the moving body whose acceleration or deceleration is to be determined.

Inasmuch as inertia force is the predominant factor in my invention for determining acceleration or deceleration and as this force is directly proportionate to slight variations it is manifest that slight accelerations or decelerations may be determined and moreover all accelerations and decelerations may be accurately determined.

The underlying principle of this invention resides in providing weighing means susceptible of indicating or recording acceleration or deceleration by reflecting the inertia of some known mass without appreciable movement in the actuating means to which the weighing means is responsive. Hence, it will be understood that the weighing means need not be that which has been illustrated and described for other suitable means may be employed for the purpose. Thus, if electrical means are employed other forms of variable resistance means, of which well known variable resistance crystals are an example, may be used and pneumatic, hydraulic or mechanical weighing means may be employed if desired.

While I have illustrated and described selected embodiments of my invention it is to be understood that these are capable of variation and modification and I therefore do not wish to be limited to the precise details set forth but desire to avail myself of such changes and alterations as fall within the scope of the following claims.

I claim:

1. In a device for measuring the acceleration or deceleration of a rotatable body, a known mass including a plunger, means for rotating the known mass at a velocity equal to the velocity of the body, an electrical circuit including a coil mounted on said body and through which said plunger is extended and also including means mounted on said body and on which the inertia force of said mass is impressed by said plunger when the velocity of said body is affected and operable to induce a current flow through said circuit proportionate to the inertia force to thereby cause said coil to exert a force on said plunger equal to and opposite to said inertia force, and means in said circuit for measuring the induced current flow.

2. In a device for measuring the acceleration or deceleration of a rotatable body, a known mass including a plunger, means for rotating the known mass at a velocity equal to the velocity of the body, an electrical circuit including a coil mounted on said body and through which said plunger is extended and also including means mounted on said body and on which the inertia force of said mass is impressed by said plunger when the velocity of said body is affected and operable to induce a current uow through said circuit proportionate to the inertia force to thereby cause said coil to exert a force on said plunger substantially equal to and opposite to said inertia force, stationary means in said circuit for measuring the induced current flow, and means in said circuit for electrically connecting the stationary means in said circuit with the coil and means in said circuit mounted on said rotatable body.

ROSSER L. WILSON.